United States Patent [19]

Lunt et al.

[11] Patent Number: 5,676,392
[45] Date of Patent: Oct. 14, 1997

[54] APPARATUS FOR RETAINING AN AIRBAG WITHIN AN AIRBAG MODULE HOUSING

[75] Inventors: Larry F. Lunt; Donald J. Paxton, both of Brigham City; David L. Spilker, Pleasant View, all of Utah; Harold A. Rothenberger, Millville, Calif.

[73] Assignees: Morton International, Inc., Chicago, Ill.; A & B Plastics, Inc., Yakima, Wash.

[21] Appl. No.: 694,204

[22] Filed: Aug. 8, 1996

[51] Int. Cl.⁶ ................................ B60R 21/16
[52] U.S. Cl. ............... 280/728.2; 248/99; 280/732
[58] Field of Search .................. 280/728.2, 728.1, 280/732; 248/99

[56] References Cited

U.S. PATENT DOCUMENTS

| 4,776,928 | 10/1988 | Perlich | 204/12 |
| 5,344,182 | 9/1994 | Lauritzen et al. | 280/728.2 |
| 5,413,375 | 5/1995 | Daines et al. | 280/728.2 |
| 5,454,588 | 10/1995 | Rose | 280/732 |

Primary Examiner—Eric D. Culbreth
Attorney, Agent, or Firm—George W. Rauchfuss, Jr.

[57] ABSTRACT

An improved retainer rod for a passenger-side airbag is formed of two different plastics having different physical characteristics by a dual durometer extrusion process. The improved retainer rod has a cylindrical main body of a hard rigid plastic which can withstand bag deployment forces and a sheet-like flag of softer flexible plastic which can be sewn to the bag material.

11 Claims, 1 Drawing Sheet

APPARATUS FOR RETAINING AN AIRBAG WITHIN AN AIRBAG MODULE HOUSING

TECHNICAL FIELD

This invention relates to the field of vehicle airbag modules. More specifically, it relates to the field of retaining airbags within a passenger-side airbag module.

BACKGROUND ART

The housing structure of a passenger-side vehicle airbag module provides protection for the gas generator and the inflatable bag until the time of deployment of the latter. This structure includes means for mechanically coupling the mouth of the airbag to the reaction canister. The load resulting from airbag deployment is large. The usual method of coupling the airbag to the module involves a pair of pockets on opposite sides of the rectangular airbag mouth. A rigid retainer rod is inserted into each pocket such as disclosed in U.S. Pat. No. 5,413,375 issued to the assignee of this application. The pockets with the enclosed rods are then inserted into U-shaped rails such as might be formed on a diffuser plate contained within the module. Each of the retainer rods includes an integral "flag" in the form of a thin sheet which is shorter than the length of the rod. Each airbag pocket is stitched around the boundaries of the flag to prevent the rod from slipping out of place.

The rigid prior art retainer rods are produced by an injection molding process. When a rod of a different length is required, a new mold must be produced and is expensive to modify if later length changes are required. Another problem arises if the insertion end of the pocket is smaller than the width of the flag. The flag must then be rolled about the rod to insert it. This often causes the flag to crack or break off from the rod.

Accordingly, it is a primary object of the present invention to provide an improved retainer rod which can be extruded and cut to any desired length. Other objects are to produce such a rod which retains the strength to withstand airbag deployment, which has a flexible flag, and which may be sewn directly to the airbag fabric material. The manner in which these objects are achieved will become apparent from the following description and appended claims.

DISCLOSURE OF INVENTION

A one piece retainer rod comprises a cylindrical rod portion of a hard and rigid plastic. It is extruded in a dual durometer extrusion process together with a flag or tab of a much softer and flexible plastic which is integral with the rod portion. The line of stitching extends through both the airbag fabric and the flag material.

BEST MODE FOR CARRYING OUT THE INVENTION

Figure 1:
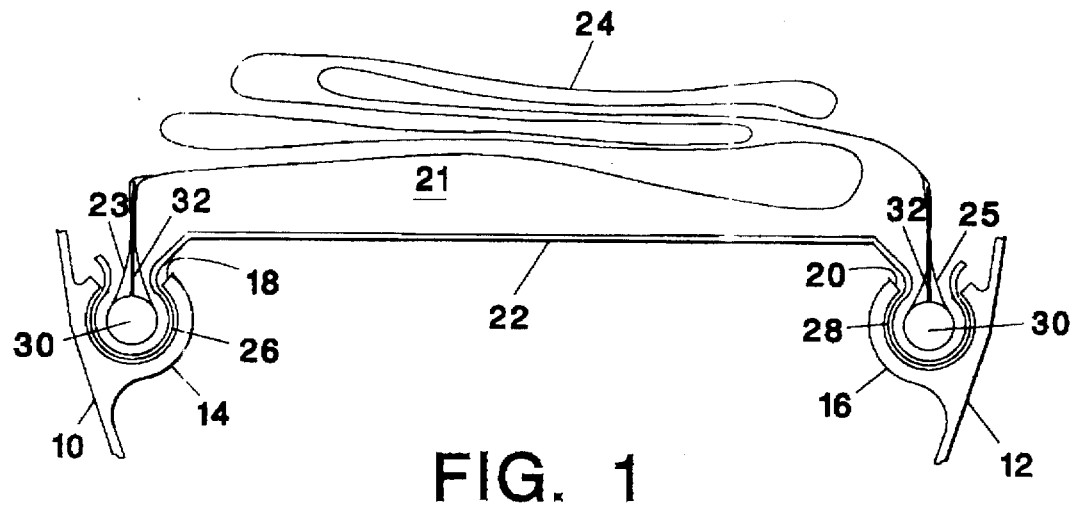
FIG. 1 is an end view of a portion of a reaction canister showing a diffuser plate and a folded airbag.

Referring first to FIG. 1, the upper portions of the sidewalls 10, 12 of a trough-shaped reaction canister are illustrated, the end caps of the canister being removed. Typically the canister may be extruded of aluminum and each sidewall carries upon its inner surface a mounting channel 14, 16 through which extend longitudinal openings 18, 20. The mouth of the reaction canister is spanned by a diffuser plate 22. The function of the diffuser 22 is to evenly spread the gases from an inflator (not shown) to the airbag 24 which is schematically shown in collapsed and folded form. The edges of the metal diffuser plate 22 are curved downwardly and bent to form a pair of U-shaped rails 26, 28 which are arranged to slide within the open ends of the respective channels 14, 16.

Figure 2:
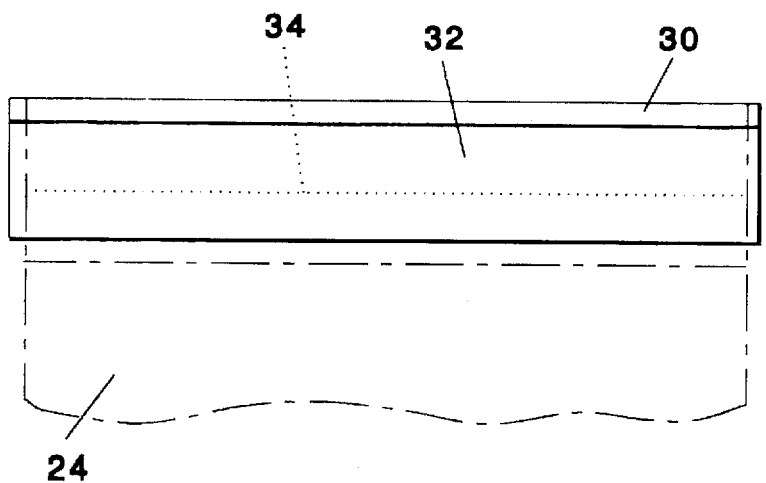
FIG. 2 is an elevational view of the retainer rod of this invention, illustrating its relationship to the edge of an airbag.
Figure 3:
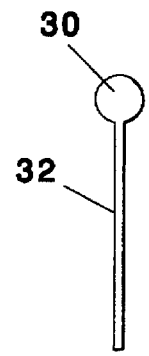
FIG. 3 is an end view of the retainer rod of FIG. 2.

FIGS. 2 and 3 illustrate the retainer rod of this invention. Two such rods are employed in the invention in pockets 23, 25 on opposite sides of the mouth 21 of the airbag 24. However, since the two rods are identical only one need be described. The retainer rod is formed by a conventional dual extrusion process wherein two extruders empty into a single extrusion die. A description of such a process will be found, for example, in U.S. Pat. No. 4,776,928 of Perlich.

A cylindrical rod portion 30 of the retainer rod is formed from a hard, tough, and rigid plastic material for structural rigidity during deployment of the airbag. This tough and rigid plastic material will generally have a high flexural modulus (ASTM D-790) of at least about $3.5 \times 10^5$ psi and preferably about $3.98 \times 10^5$ psi. It generally has a tensile strength at break (ASTM D-648) of at least about 2000 psi or more, preferably at least 2500 psi or more, and a heat deflection temperature (ASTM D-648) of at least about 190° F. (87° C.). It will generally have a Rockwell hardness (R scale) of about 100–115 (ASTM D-785), preferably about 112. A preferred resin for the rod portion 30 is an acrylonitrile-butadiene-styrene (ABS) resin, and especially suitable is GPC Delta D-150 ABS resin available from Hsimex Plastics of Taiwan.

Extruded integrally and unitarily with the cylindrical rod portion 30 is a thin flag or tab 32 of a much softer, pliable and flexible plastic material. This soft and flexible plastic material will generally have a Shore A hardness (ASTM D-2240) of about 50–100, preferably about 80, a tensile strength at break (ASTM D-638) is about 2000–3500 psi, preferably about 2700 psi or more, an elongation at break (ASTM D-638) is about 200–450%, preferably about 350% aria a heat deflection temperature (ASTM D-648) of at least about 190° F. (87° C.). A preferred material is a flexible polyvinyl chloride (PVC) resin, especially Unichem 8000 flexible PVC resin from Colorite Plastics Company of Ridgefield, N.J. The flag 32 extends outwardly from the rod portion 30 and substantially lies in a plane that extends radially from the cylindrical rod portion.

The soft flag or tab has the ability to move and stretch during the loading of the airbag during deployment thereby helping to reduce if not eliminate high seam loading concentration points along the retaining flag seam or stitch line 34 and more evenly distributes the loading to the retaining flag stitch line.

Also the soft, pliable and flexible nature of the flag 32 permits it to be wrapped around rod 30 while being inserted into the rod pocket and then to be laid out flat in the pocket to attach it to the airbag 24.

Because the composite retainer rod is extruded, it may be cut to any desired length to fit a particular application and the flag will extend the entire length of the rod portion. Furthermore, since the flag portion 32 is thin and relatively soft and pliable, it may be sewn directly to the fabric of the airbag 24 along the entire length of the retainer rod pocket as by a line of stitching 34 as illustrated in FIG. 2.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A composite airbag retainer rod for retaining opposite sides of a mouth of an automotive airbag to opposite sidewalls of a reaction canister which composite airbag retainer rod comprises:

a substantially cylindrical rigid rod portion; and a flexible flag sheet softer than, and unitary with, said cylindrical rod portion and lying in a plane extending substantially radially from said cylindrical rod portion, said flexible flag sheet being stitchable to the airbag.

2. The composite rod of claim 1 wherein said rod portion has a Rockwell hardness on the R scale of about 100 to about 115 and wherein said flag has a Shore A hardness of about 50 to about 100.

3. The composite rod of claim 2 wherein said Rockwell hardness is about 112.

4. The composite rod of claim 2 wherein said Shore A hardness is about 80.

5. The composite rod of claim 4 wherein said Rockwell hardness is about 112.

6. In an automotive airbag having a substantially rectangular mouth, a pocket formed in each of two opposite sides of said mouth, and a retainer rod in each of said pockets, the improvement wherein said retainer rod comprises a composite rod having:

a substantially cylindrical rigid rod portion; and a flexible flag sheet softer than, and unitary with, said cylindrical rod portion and lying in a plane extending substantially radially from said cylindrical rod portion.

7. The improvement of claim 6 wherein said rod portion has a Rockwell hardness on the R scale of about 100 to about 115 and wherein said flag has a Shore A hardness of about 50 to about 100.

8. The improvement of claim 7 wherein said Rockwell hardness is about 112.

9. The improvement of claim 6 wherein said Shore A hardness is about 80.

10. The improvement of claim 9 wherein said Rockwell hardness is about 112.

11. The improvement of claim 6 wherein said flag is stitched to said airbag.

* * * * *